United States Patent Office 3,611,481
Patented Oct. 12, 1971

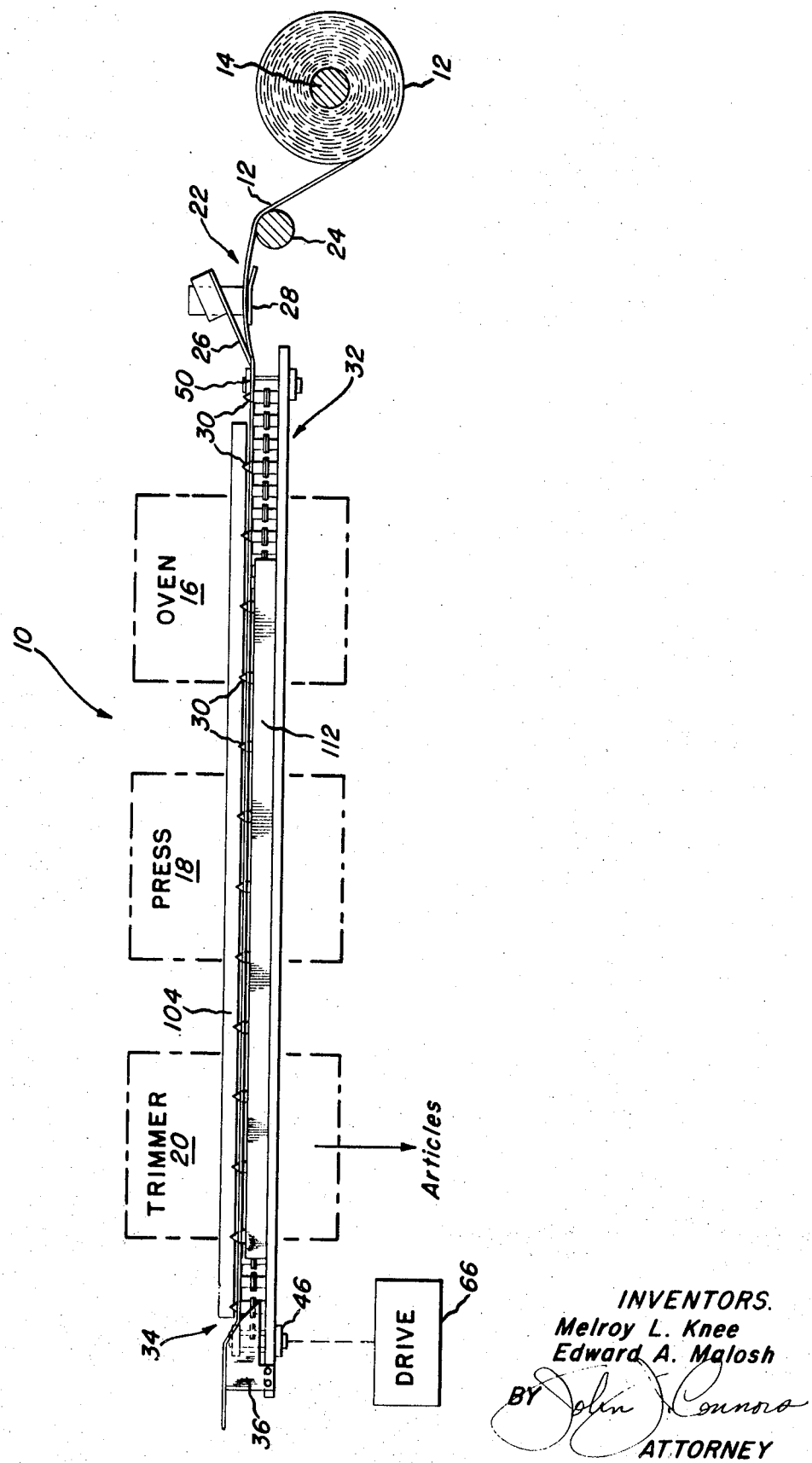

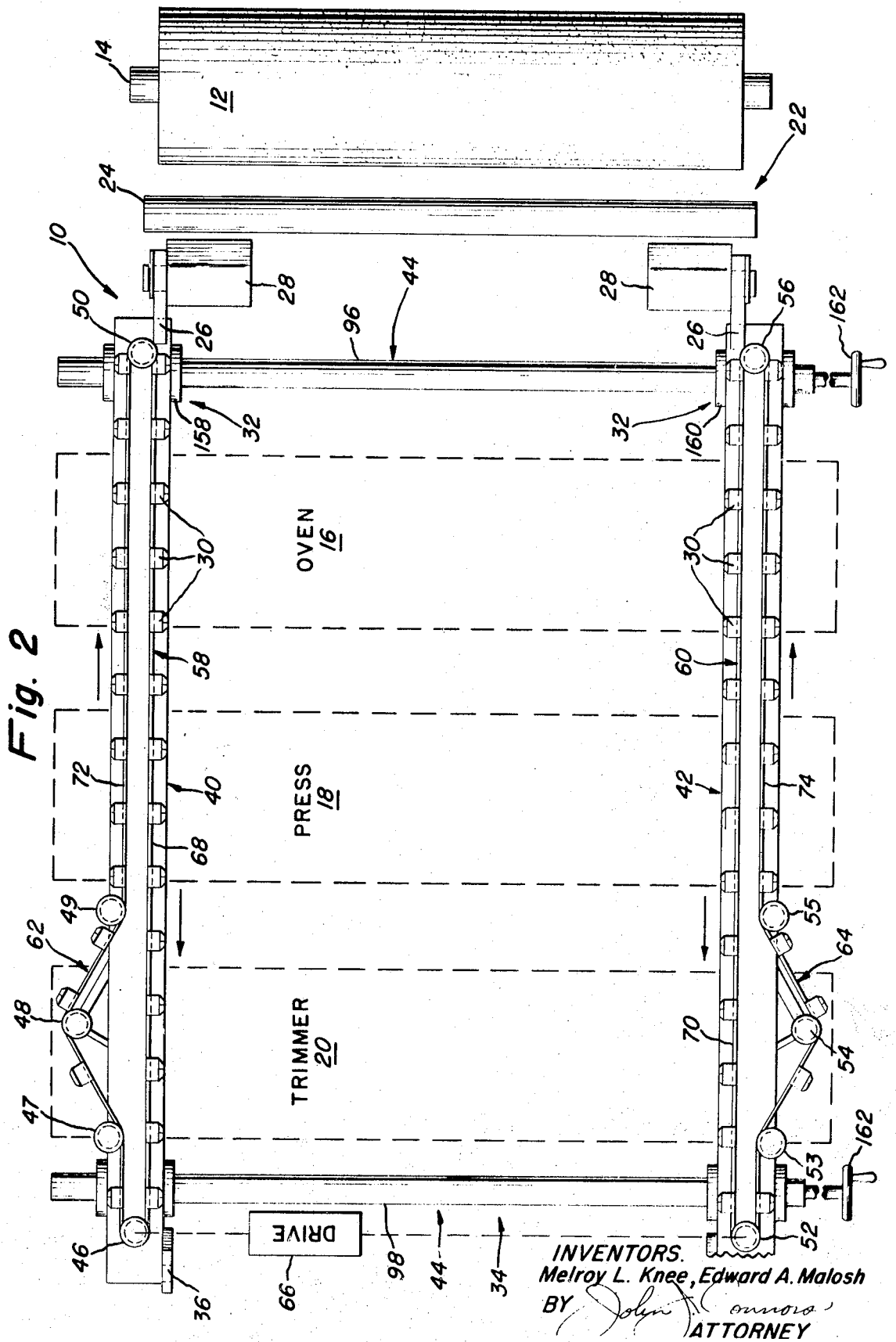

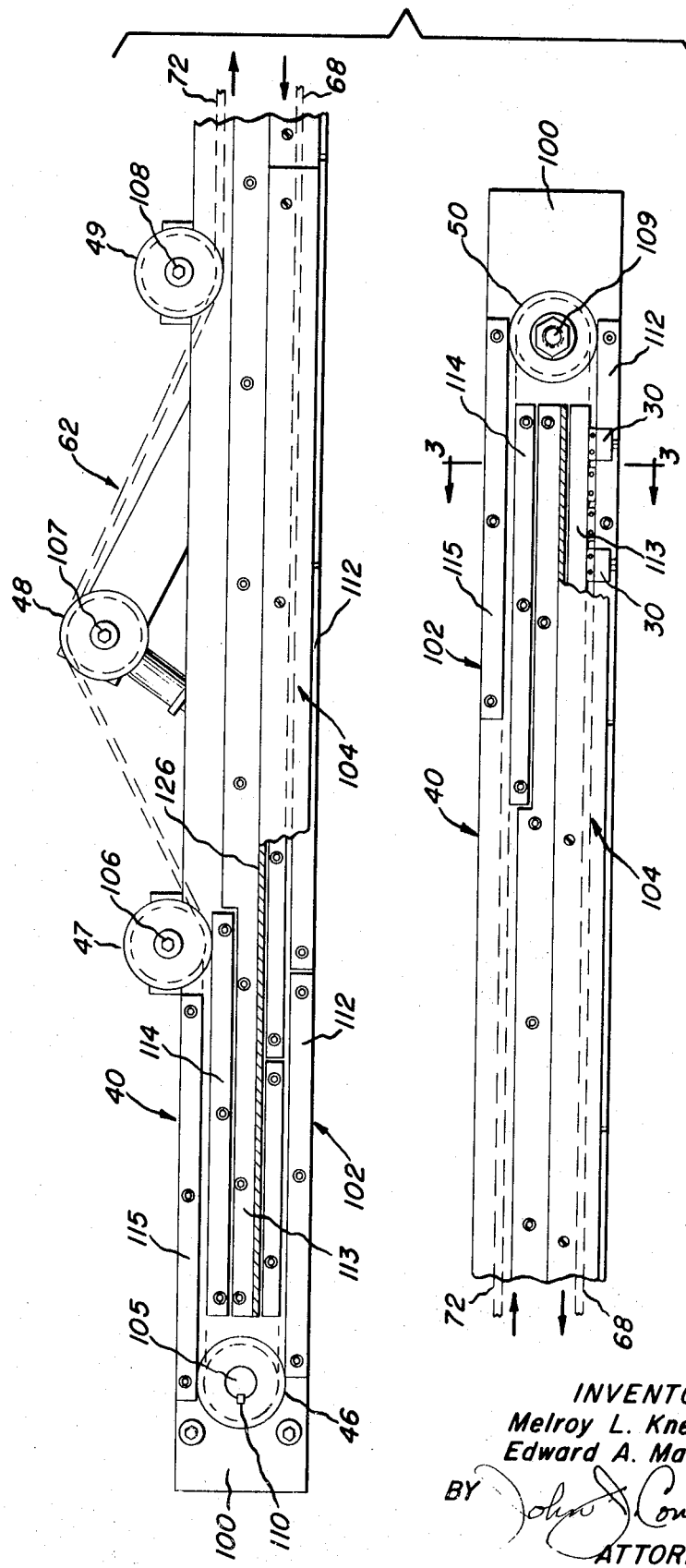

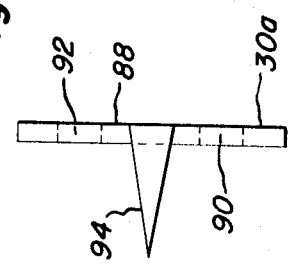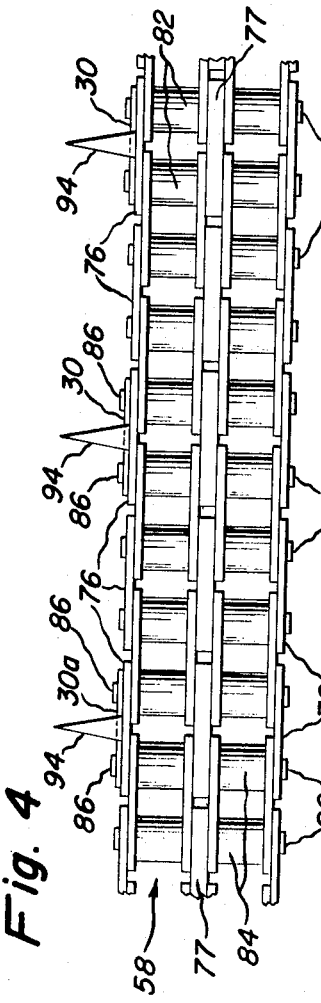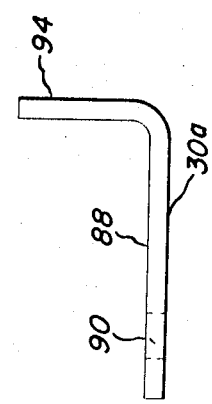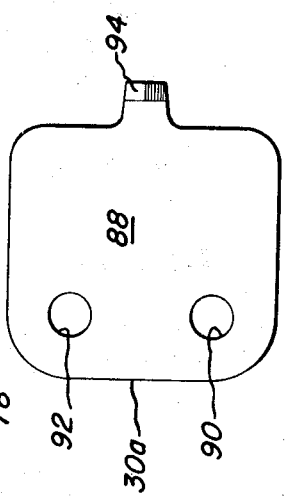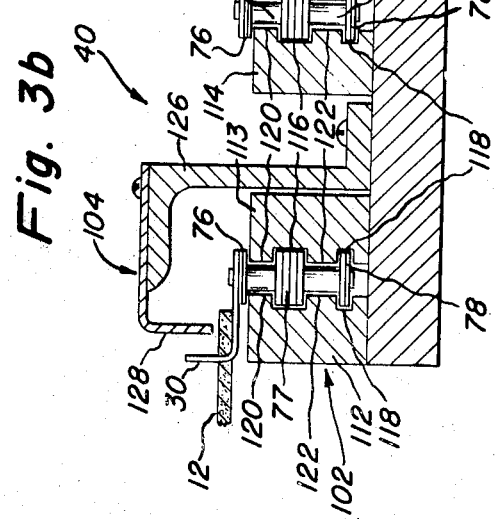

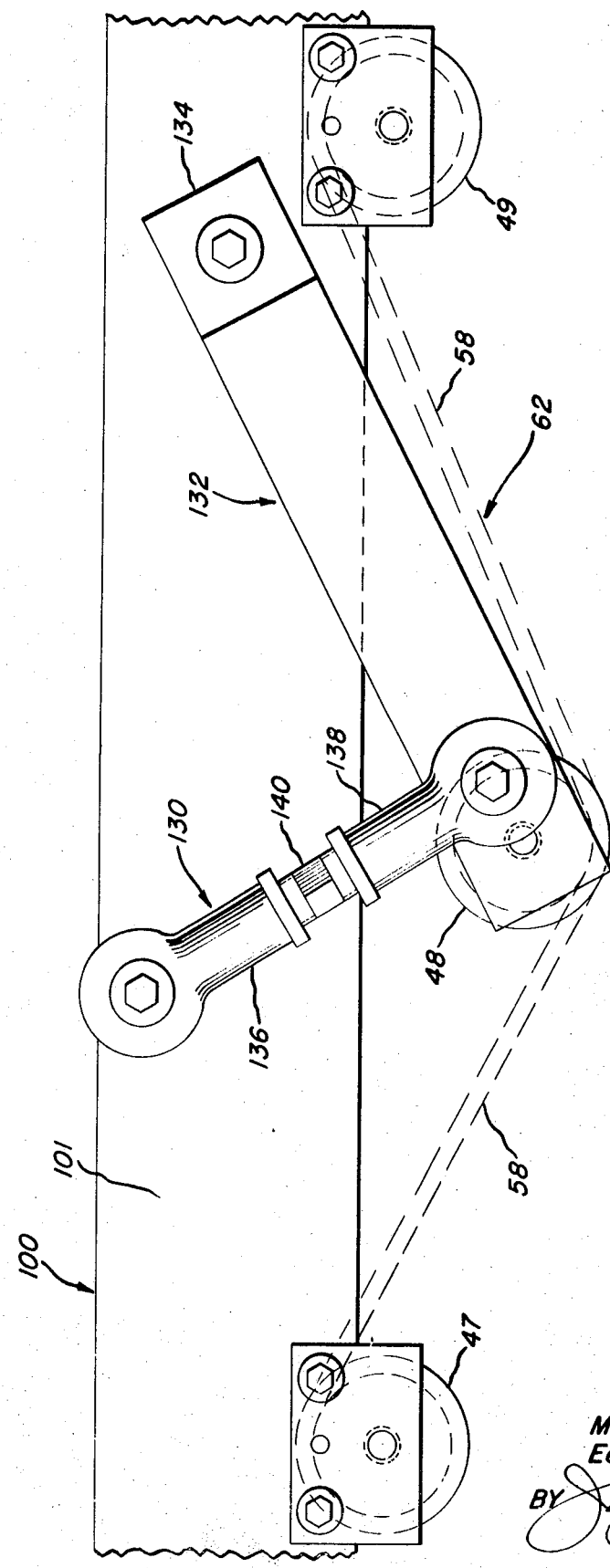

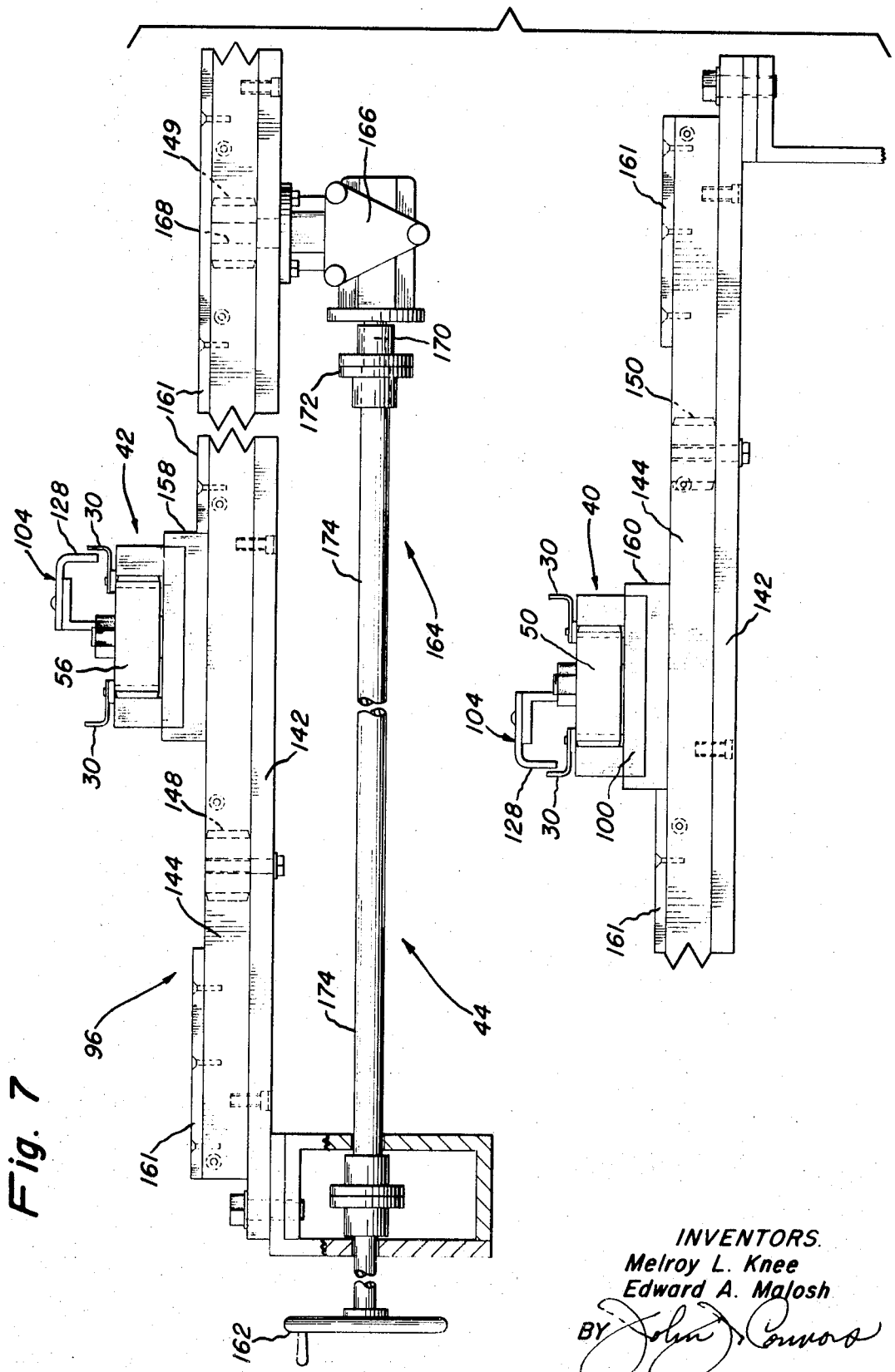

3,611,481
MOLDING APPARATUS HAVING SHEET TRANSPORTING MEANS WITH PIERCER MEANS THEREON
Edward A. Malosh, Eau Claire, Wis., and Melroy L. Knee, Austin, Minn., assignors to Standard Oil Company, Chicago, Ill.
Filed Sept. 22, 1969, Ser. No. 859,824
Int. Cl. B29b 3/00; B29c 3/04
U.S. Cl. 18—4 P
3 Claims

ABSTRACT OF THE DISCLOSURE

Disclosed is a novel sheet transporting apparatus including driven sprocket means having generally vertical axes of rotation, endless roller chain means carried by the sprocket means, restraining means adjacent to chain paths which engage the chain's rollers and restrain the chain means' lateral movement, and piercer means mounted on the chain means in a position to impale a sheet.

BACKGROUND OF THE INVENTION

Conventional thermoforming apparatus used to manufacture articles from foamed plastic sheets ordinarily includes an oven, press, and sheet transporting means which carries a sheet through the oven and press. In the oven the sheet material is heated to a temperature of about 240° F., and then it is carried into the press where an article is molded out of the heated sheet material by pressing the sheet material between a pair of dies. The sheet material tends to shrink as it moves through the oven, and this shrinking tendency places a strain on the sheet transporting means so that it tends to wear out quickly. Thus, it would be highly desirable to prolong the life of the sheet transporting means. Moreover, conventional sheet transporting means are bulky, requiring that the heating elements of the oven and the surface of the sheet be spaced apart a substantial distance. But it would be highly desirable to bring the sheet closer to these heating elements, or vice versa, to increase the efficiency of the oven.

DESCRIPTION OF THE INVENTION

We have invented an improved thermoforming apparatus including novel sheet transporting means which does not wear out quickly and which permits the sheet and heating elements to be brought close together. This sheet transporting means includes a plurality of spaced, endless chain means driven by sprocket means having generally vertical axes of rotation. Each chain means moves along predetermined paths disposed in the same generally horizontal plane, and each of these chain means also includes roller means having generally vertical axes of rotation. Piercer elements, extending upwardly from the generally horizontal plane through which the chain means moves, are mounted on the chain means. Thus the piercer elements can impale a thermoplastic sheet which is fed into the entrance of the apparatus. Restraining means adjacent to chain paths engage the roller means to restrain lateral movement of the chain means, and sheet holding means overlying a portion of each chain path retain an impaled sheet on the piercer elements.

The preferred chain means includes a series of links having first and second link plates coupled together by pins at right angles to these plates. Rollers are mounted on these pins between the link plates so that they are free to revolve about the pins. The piercer elements are mounted on the ends of the pins, and each element includes a pointed vertical spear end extending upwardly and outwardly at a right angle from the link plates. Preferably, the chain means are mounted on moving means adapted to move relative to each other; hence, different sheet widths of thermoplastic material can be accommodated. The moving means preferably includes a gear and rack mechanism. The chain means may also include tensioning means for controlling the tension in the chain means.

DESCRIPTION OF DRAWINGS

FIG. 1 is a schematic side view of the thermoforming apparatus of our invention showing the novel sheet transporting means.
FIG. 2 is a schematic plan view of the apparatus illustrated in FIG. 1 showing the novel sheet transporting means mounted on moving means.
FIG. 3a is an enlarged plan view with sections broken away illustrating in detail one of the rail assemblies shown in FIG. 2;
FIG. 3b is a cross-sectional view taken along line 3—3 of FIG. 3a;
and FIG. 3c is a detailed view of one of the chain tightners.
FIG. 4 is an enlarged side elevational view illustrating in detail a section of one of the roller chains shown in the above figures.
FIG. 5a is a plan view of one of the piercer elements shown in FIG. 4;
FIG. 5b is a side elevational view of this piercer element;
and FIG. 5c is a front elevational view of this pierce element.
FIG. 7 is an end elevational view of the support means illustrated in FIG. 6 showing the rail assemblies mounted thereon.

DESCRIPTION OF PREFERRED EMBODIMENT

General

Figure 6:
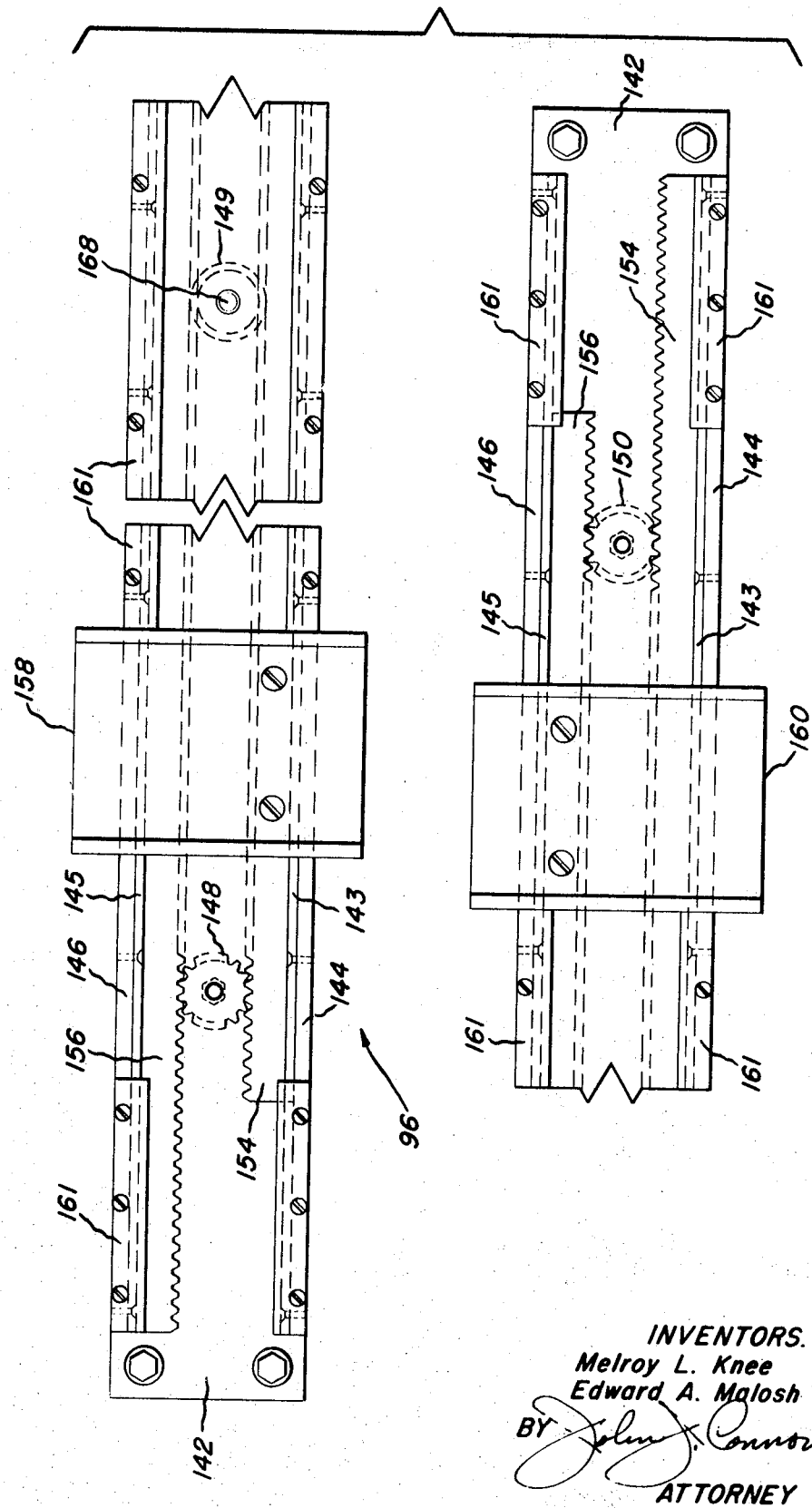
FIG. 6 is a plan view of one of the support means of the rail assemblies' moving means.

The overall configuration of thermoforming apparatus 10 of our invention is schematically illustrated in FIGS. 1 and 2. Roll stock of foamed plastic sheet material 12 carried on spindle 14 is first drawn into appaartus 10, and it then sequentially passes through oven 16, press 18, and trimmer 20. Oven 16, press 18, and trimmer 20 are conventional equipment, and are therefore only shown in dotted lines. At entrance 22 of apparatus 10, sheet material 12 is first passed over guide roller 24, then between upper and lower sheet guides 26 and 28, and next impaled on piercer elements 30 of sheet transporting means 32. Upper guide 26 forces sheet 12 against piercer elements 30 to push the sheet on elements 30. Impaled sheet 12 is then carried by transporting means 32 in a stepwise fashion through apparatus 10. Oven 16 heats impaled sheet material 12, press 18 squeezes the heated sheet between dies to make thermoformed articles, and trimmer 20 cuts off rough edges from the articles which leave apparatus 10 via the open bottom of the trimer. The marginal edges of sheet 12 remain impaled on elements 30 until they reach exit 34. Then a pair of wedge-like stripper means 36 (only one shown) lift the trimmed edge material off transporting means 32.

As shown in FIG. 2, sheet transporting means 32 includes a pair of spaced rail assemblies 40 and 42 which are mounted on moving means 44. Moving means 44 are adjusted so that rail assemblies 40 and 42 are spaced to accommodate the width of the sheet being transported through apparatus 10. Rail assembly 40 includes sprockets 46–50, and rail assembly 42 includes sprockets 52–56. All these sprockets have vertical axes of rotation. Trained about sprockets 46–50 is endless roller chain 58, and trained about sprockets 52–56 in a like manner is endless roller chain 60. Chain tightners 62 and 64 control the tension of roller chains 58 and 60, respectively; and drive means 66 turns drive sprocket 46 for chain 58 and drive sprocket 52 for chain 60. Thus chains 58 and 60 move in synchronization through the same generally horizontal plane.

Removably mounted on roller chains 58 and 60 are piercer elements 30 which pierce the underside of sheet material 12. Flights 68 and 70 of claims 58 and 60, respectively, carry sheet material 12 impaled on piercer elements 30 from entrance 22 to exit 34. Sheet material adjacent flights 68 and 70 rides up and over strippers 36, and is thus lifted off elements 30. Flights 72 and 74 of chains 58 and 60, respectively, then carry piercer elements 30 to entrance 22 where they can once again impale unwound sheet material 12.

Roller chain and piercer elements

FIG. 4 depicts the detail structure of roller chain 58, which is essentially identical to chain 60, and FIGS. 5a. 5c illustrate piercer element 30a, which is essentially identical to all other such elements. Roller chain 58 includes upper link plates 76, intermediate link plates 77, and lower link plates 78. These plates 76–78 are interconnected by pins 80, and rotatably mounted on the pins, between upper link plates 76 and intermediate link plates 77, is a series of rollers 82. There is also mounted on pins 80 between intermediate link plates 77 and lower link plates 78 another series of rollers 84. These series of rollers 82 and 84 freely revolve around pins 80. A double row of rollers is preferred because enhanced structural rigidity is imparted to roller chain 58. Thus, the shrinking tendency of sheet material 12 will not tend to twist or buckle roller chains 58 and 60.

Mounted on ends 86 of adjacent pairs of pins 80 are piercer elements 30. These piercer elements 30 snap over ends 86, and simple prying removes them. Thus if they are damaged or need to be cleaned and/or sharpened, they can be easily removed. As shown in FIGS. 5a through 5c, piercer element 30a has a flat, spring-clip type base 88 in which are bored two holes 90 and 92 for accommodating ends 86 of pins 80. Projecting upwardly from base 88 is a pointed, vertical spear piece 94. With a minimum of force, spear piece 94 will pierce into and through sheet material 12. Piercer elements 30 mounted as illustrated allows the heaters (not shown) in oven 16 to be brought close to the surface of sheet material 12. This improves the efficiency of oven 16.

Rail assembly

FIGS. 3a–3c illustrate in detail rail assembly 40, which is essentially identical to rail assembly 42. Assembly 40 includes base plate 100 on which are mounted sprockets 46–50, chain restraining means 102, sheet holding means 104, and chain tightner 62. Sprockets 46–50 are carried on vertical axes 105–109, and drive sprocket 46 is secured by key 110 to axis 105. The other sprockets, 47–50, are free to revolve about their respective axes 106–109. Since sprockets 46–50 have vertical axes of rotation, link plates 76–78 will be generally in a horizontal plane and the series of rollers 82 and 84 will have generally vertical axes of rotation. This spacial arrangement of chain means 58 is designed to prevent sheet material 12 from shrinking when heated.

As best seen in FIG. 3b, chain restraining means 102 includes elongated members 112–115 which are fastened to base plate 100. Members 112 and 113 straddle flight 68 of chain 58, and members 114 and 115 straddle flight 72 of this chain 58. Members 112–115 each include large U-shaped upper grooves 116 and small U-shaped lower grooves 118. Intermediate link plates 77 ride in large grooves 116, and lower link plates 78 ride in small grooves 118. Upper series of rollers 82 roll over surfaces 120 of these members 112–115, and lower series of rollers 84 roll over surfaces 122 of these members. Members 112–115 restrain lateral movement of chain 58, preventing chain 58 from moving laterally when sheet material 12 is heated in oven 16, but enabling chain 58 to move through its endless path about sprockets 46–50.

Sheet holding means 104 is preferably an elongated member having a T-cross-section. This T-shaped member 104 includes bracket 126 which is secured to base plate 100 and downwardly extending arm 128 pressing against sheet material 12 impaled on piercer elements 30. Consequently, sheet material 12 is held on piercer elements 30 until it reaches exit 34.

Chain tightner 62 includes rod 130 and arm 132 secured to the underside 101 of base plate 100. Arm 132, which supports sprocket 48, is pivotally mounted at its end 134 to underside 101. Rod 130 has two separate pieces 136 and 138 connected together by adjusting bar 140. Piece 136 is connected to underside 101, piece 138 is connected to arm 132, and adjusting bar 140 is seated between these pieces 136 and 138 in treaded housings in the ends of the pieces. Upon turning adjusting bar 140, pieces 136 and 138 either move closer together or further apart, depending upon which direction adjusting bar 140 is turned. The length of rod 130 is thus adjusted to control the position of arm 132, and this arm position regulates the tension in chain 58.

Moving means

Rail assemblies 40 and 42, as shown in FIG. 2, are mounted on moving means 44 which includes a pair of space support means 96 and 98 lying transverse to the direction of movement of sheet material 12. Rail assemblies 40 and 42 lie across and are secured to these support means 96 and 98, and manipulation of handles 162 adjusts the distance between these rail assemblies.

FIGS. 6 and 7 illustrate in detail support means 96, which is substantially identical to support means 98. Means 96 includes base plate 142 which has secured thereto spaced, vertical guide plates 144 and 146. Rotatably mounted on base plate 142 are three spur gears 148–150; and slidably mounted against each guide plate 144 and 146 are, respectively, racks 154 and 156, which are free to move sidewise along bearing tracks 143 and 145 secured to guide plates 144 and 146. Secured to rack 154 is holder 158 for rail assembly 4w, and secured to rack 156 is holder 160 for rail assembly 40. Holders 158 and 160 are above guide plates 144 and 146, passing over these guide plates when racks 154 and 156 move, and stops 161 on guide plates 144 and 146 limit the lateral movement of holders 158 and 160.

The teeth of racks 154 and 156 mesh with the teeth of spur gears 148–150, and when spur gear 149 turns, holders 158 and 160 are drawn closer together or move farther apart depending on the direction of rotation of this spur gear 149. Spur gear 149 is rotated by any suitable means such as handle 162 which transmits its turning force through gear and shaft assembly 164. The gear and shaft assembly includes gear unit 166, having output shaft 168 connected to and carrying spur gear 149, and input shaft 170 connected via coupling 172 and drive shaft 174 to handle 162. Turning handle 162 thus turns spur gear 149, and the direction in which the handle is turned determines whether holders 158 and 168, and rail assemblies 40 and 42, will be brought closer together or moved farther apart. For purposes of illustration, support means 96 and 98 are shown as each having handles 162 for adjusting the distance between rail assemblies 40 and 42. However, a single means could be used so that the distance between assemblies 40 and 42 could be adjusted simultaneously.

We claim:
1. Apparatus for making thermoformed articles from a thermoplastic sheet which tends to shrink upon being heated, comprising an entrance and an exit, and between the entrance and exit, oven means for heating the sheet, means for thermoforming articles from said heated sheet, and means for transporting the sheet through the oven means and thermoforming means, said transporting means including:
  (a) a pair of endless chain means spaced apart a distance which about equals the width of the sheet being transported, each of said chain means having a series of links which include upper and lower spaced link plates, pins interconnecting said upper and lower link plates, and rollers rotatably mounted on the pins and disposed between said upper and lower link plates,
  (b) piercer means mounted on the upper link plates so that as the sheet enters the apparatus the piercer means impale the sheet by piercing the underside of said sheet,
  (c) sprocket means which train the chain means to move through closed loop paths having first flights moving from the entrance towards the exit and second flights moving from the exit towards the entrance, said sprocket means having generally vertical axes of rotation, whereby the link plates will be in a generally horizontal plane and the rollers will have generally vertical axes of rotation,
  (d) restraining means adjacent at least the first flights which engage the roller means to restrain lateral movement of the chain means caused by the shrinking tendency of the thermoplastic sheet, and
  (e) sheet-holding means overlying the first flights in a position adapted to retain impaled sheets on the piercer means.

2. The apparatus defined in claim 1 wherein the chain means are mounted to move relative to each other to accommodate different sheet widths.

3. The apparatus defined in claim 1 wherein the piercer means are removably mounted.

References Cited

UNITED STATES PATENTS

| | | | |
|---|---|---|---|
| 3,160,340 | 12/1964 | Menkel | 226—53 |
| 3,359,600 | 12/1967 | O'Brien et al. | 18—Dig. 39 |
| 3,407,981 | 10/1968 | Staugaard | 226—74 X |
| 3,486,197 | 12/1969 | Williams et al. | 18—19 F |
| 3,613,505 | 5/1970 | Brown et al. | 18—19 F |

ROBERT L. SPICER, JR., Primary Examiner

U.S. Cl.X.R.

18—19 R; 226—74